US008375331B1

(12) United States Patent
Mayers

(10) Patent No.: US 8,375,331 B1
(45) Date of Patent: *Feb. 12, 2013

(54) SOCIAL COMPUTING PERSONAS FOR PROTECTING IDENTITY IN ONLINE SOCIAL INTERACTIONS

(75) Inventor: Eric Mayers, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/219,398

(22) Filed: Aug. 26, 2011

Related U.S. Application Data

(60) Provisional application No. 61/526,567, filed on Aug. 23, 2011.

(51) Int. Cl.
*G06F 3/048* (2006.01)

(52) U.S. Cl. ........ 715/835; 715/765; 715/733; 715/810; 705/319

(58) Field of Classification Search .................. 715/700, 715/733, 738, 751, 753, 764, 765, 835, 838, 715/810; 705/319, 325; 709/203, 204
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,594,193 B2 * | 9/2009 | Thomas | 715/835 |
| 7,610,287 B1 | 10/2009 | Dean et al. | |
| 7,742,468 B2 | 6/2010 | Vagelos | |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2005/0210409 A1 | 9/2005 | Jou | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0019353 A1 * | 1/2008 | Foote | 370/352 |
| 2008/0056475 A1 | 3/2008 | Brannick et al. | |

(Continued)

FOREIGN PATENT DOCUMENTS

WO WO02079984 10/2002

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Xiomar L Bautista
(74) *Attorney, Agent, or Firm* — Patent Law Works LLP

(57) ABSTRACT

A system and method for generating a plurality of personas for an account of a user is disclosed. The present invention uses an account engine to receive information for the plurality of personas and to associate the information for the plurality of personas to the account. The information for each of the plurality of personas includes a visibility level. A persona engine receives a selection from the user and transmits the selected persona to the user based on the selection. An authority engine determines an appearance of the selected persona based on the visibility level.

32 Claims, 7 Drawing Sheets

U.S. PATENT DOCUMENTS

| | | | |
|---|---|---|---|
| 2008/0192656 | A1 | 8/2008 | Vagelos |
| 2009/0125521 | A1* | 5/2009 | Petty .................................. 707/9 |
| 2009/0193520 | A1 | 7/2009 | Buss |
| 2010/0042680 | A1 | 2/2010 | Czyzewicz et al. |
| 2011/0035444 | A1* | 2/2011 | Hill ............................... 709/204 |
| 2011/0098156 | A1 | 4/2011 | Ng et al. |
| 2011/0110364 | A1* | 5/2011 | Fried et al. .................... 370/352 |
| 2011/0190066 | A1* | 8/2011 | Barclay et al. .................. 463/42 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, May 13, 2011, 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 8, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "Cinema: Columbia InterNet Extensible Multimedia Architecture," Department of Computer Science, Columbia University, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twigger, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

\* cited by examiner

SOCIAL COMPUTING PERSONAS FOR PROTECTING IDENTITY IN ONLINE SOCIAL INTERACTIONS

CROSS-REFERENCE TO RELATED APPLICATIONS

This application claims priority under 35 U.S.C. §119(e) to U.S. Provisional Patent Application No. 61/526,567, filed on Aug. 23, 2011, entitled "Social Computing Personas for Protecting Identity in Online Social Interactions" which is herein incorporated by reference in its entirety.

BACKGROUND

The specification relates to a system and method for generating personas for an account of a user. In particular, the specification relates to generating personas for a user account that includes a visibility level, a reputation and an ability to share a persona with other users.

The internet is becoming increasingly more social. Users enjoy the social interactions and frequently have entire friendships with people they have never met. Users are encouraged to post their real identities because people are more comfortable chatting and revealing personal details to another user that is posting with a name and not anonymously. Because these interactions become part of a permanent record, however, users are also encouraged to post anonymously. In addition, when users reveal their identities on the internet, it leaves them more vulnerable to stalking, identity theft and harassment. As a result, users exercise caution in disclosing personal details.

While the risk of disclosing a user's real identity can be avoided via the creation of multiple primary accounts in a system, switching between various identities for the purpose of revealing varying levels of personal information becomes burdensome and may be difficult for users with little related technical knowledge to manage. For example, each account has its own name and password and the user may have trouble remembering which account was used to perform different activities.

SUMMARY OF THE INVENTION

In some examples, a persona application includes an account engine, a communication engine, a persona engine, an authority engine and a user interface engine. The account engine receives information for generating personas for a user and associates the information for the personas with the account. The personas include at least one of the user's real identity, an alter ego and an anonymous identity. The information for each persona includes a name of the persona, a picture, a description, permissions, a visibility level, the option to share a persona and a number of websites associated with the user.

In some embodiments, a persona engine receives a selection from the user and transmits a selected persona to the user based on the selection. The persona engine transmits the information for the selected persona to a user interface engine in response to the user submitting a post, a comment, a picture, a video, a message, an article or a game. In one embodiment, the persona engine provides an option to share one of the personas with other account holders. The sharing property includes sharing with any other account holders and sharing with selected friends.

In one embodiment, an authority engine determines an appearance of the selected persona based on the visibility level for the persona. The visibility level is selected among public, public over a threshold age, visible to selected users and hidden from everyone.

In one embodiment, the authority engine authorizes other account holders to access the user's real identity based on a defined permission. The permission is chosen among allowing all friends, selected friends, all account holders or anyone to access the user's real identity. In some examples, the authority engine assigns a reputation for the selected persona according activities and feedback associated with the persona. The feedback includes one of a number of views, a number of comments and a number of indications of approval of one of the activities of the user. The activities include submitting a post, a comment, a picture, a video, a message, an article and a game.

In another embodiment, a method for generating personas for an account includes receiving information for the personas from the user, associating the information for the plurality of the personas to the account and responsive to receiving a selection from the user, transmitting a selected persona to the user based on the selection.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
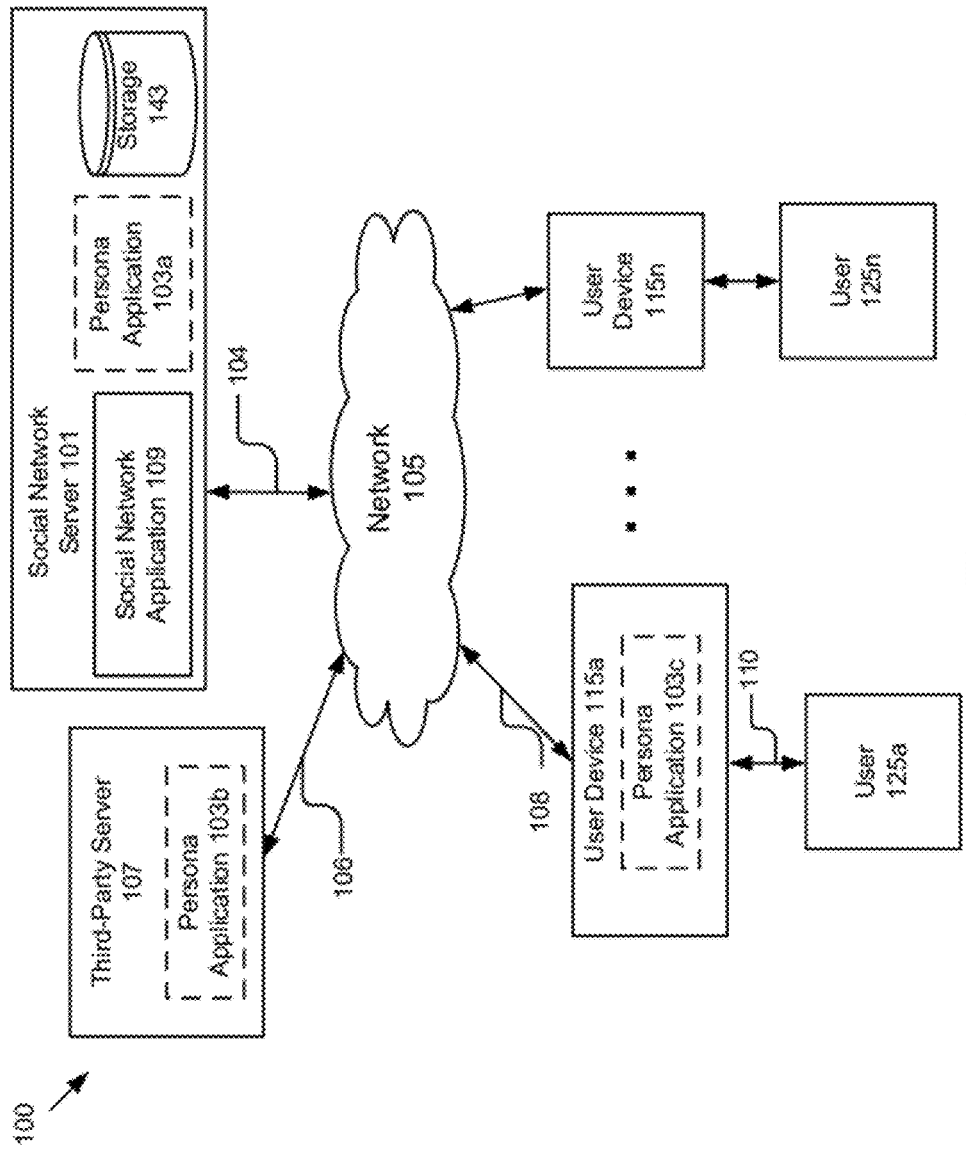
FIG. 1 is a high-level block diagram illustrating one embodiment of a system for generating a plurality of personas for an account of a user.

A system and method for generating a plurality of personas for an account of a user are described below. In the following description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

System Overview

FIG. 1 illustrates a block diagram of a system 100 for generating a plurality of personas for an account of a user according to some examples. The illustrated description of a system 100 for generating a plurality of personas for an account of a user includes user devices 115a, 115n that are accessed by users 125a, 125n, a social network server 101 and a third-party server 107. In the illustrated embodiment, these entities are communicatively coupled via a network 105. In FIG. 1 and the remaining figures, a letter after a reference number, such as "115a" is a reference to the element having that particular reference number. A reference number in the text without a following letter, such as "115," is a general reference to any or all instances of the element bearing that reference number. Although only two devices are illustrated, persons of ordinary skill in the art will recognize that any number of user devices 115n are available to any number of users 125n.

In one embodiment, the persona application 103a is operable on the social network server 101, which is coupled to the network 105 via signal line 104. The social network server 101 also includes a social network application 109 and storage for a social graph 179. In one embodiment, the persona application 103a is a component of the social network application 109. Although only one social network server 101 is shown, persons of ordinary skill in the art will recognize that multiple servers may be present.

A social network is any type of social structure where the users are connected by a common feature, for example, Google Plus. The common feature includes friendship, family, work, an interest, etc. The common features are provided by one or more social networking systems, such as those included in the system 100, including explicitly-defined relationships and relationships implied by social connections with other users, where the relationships are defined in a social graph 179. The social graph 179 is a mapping of all users in a social network and how they are related to each other. The social graph 179 is included in the memory 237 that is described below in detail.

In another embodiment, the persona application 103b is stored on a third-party server 107, which is connected to the network 105 via signal line 106. The third-party server 107 includes software for generating a website (not shown). In one embodiment, the persona application 103 generates a user interface that is incorporated into the website. Furthermore, while only one third-party server 107 is shown, the system 100 could include one or more third-party servers 107.

In yet another embodiment, the persona application 103c is stored on a user device 115a, which is connected to the network 105 via signal line 108. The user 125a interacts with the user device 115a via signal line 110. The user device 115a, 115n is any computing device that includes a memory (not shown) and a processor (not shown). For example, the user device 115a, 115n is a personal computer ("PC"), a cell phone (e.g., a smart phone, a feature phone, a dumb phone, etc.), a tablet computer (or tablet PC), a laptop, etc. One having ordinary skill in the art will recognize that other types of user devices 115a, 115n are possible. In one embodiment, the system 100 comprises a combination of different types of user devices 115a, 115n.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The persona application 103 receives information for generating personas for a user account. In one embodiment, the persona application 103 receives information from user devices 115a, 115n. The persona application 103 receives information for the personas, associates the information for the personas to the user account and responsive to receiving a selection from the user, transmits a selected persona to the user device 115 based on the selection.

Persona Application 103

Figure 2:
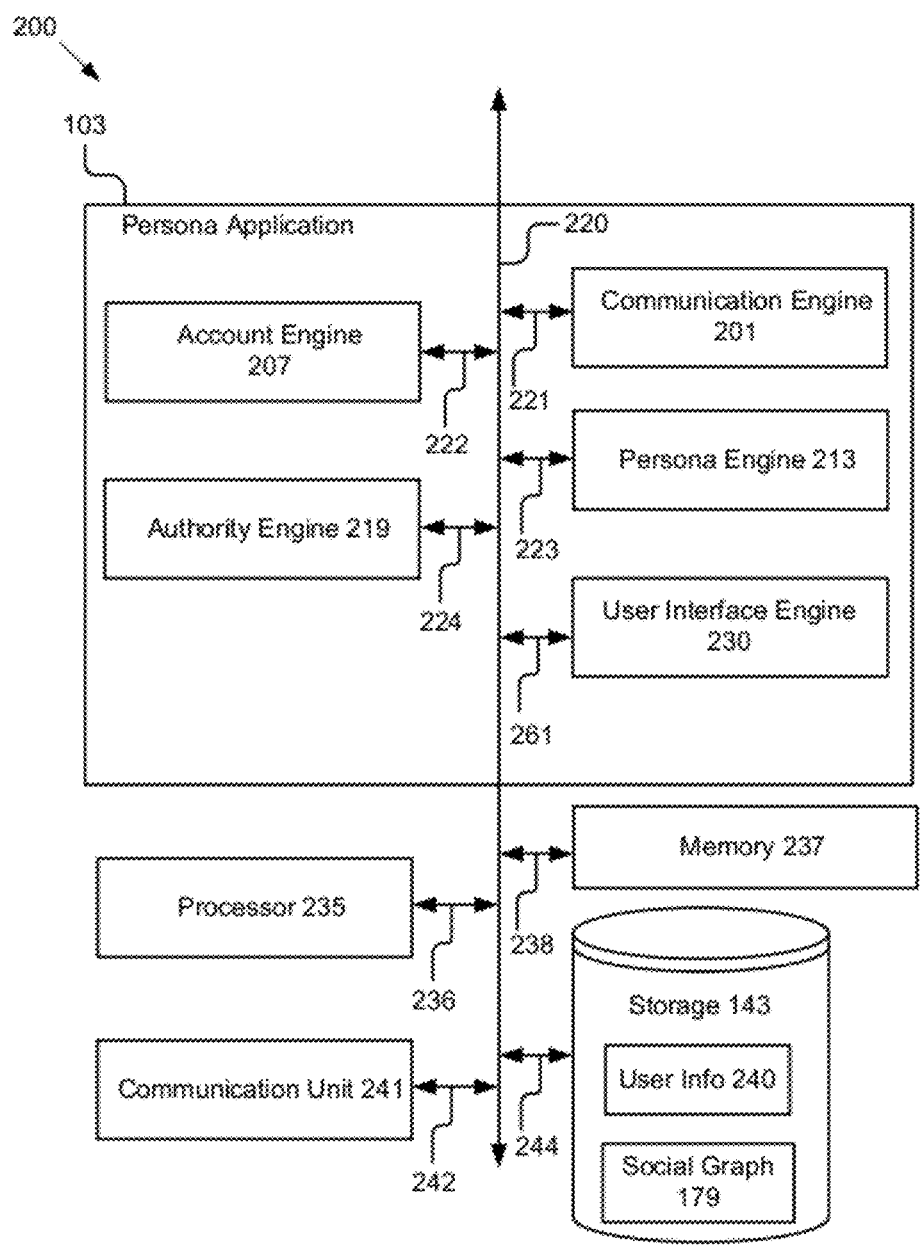
FIG. 2 is a block diagram of one embodiment of a persona application in more detail.

Referring now to FIG. 2, the persona application 103 is shown in more detail. FIG. 2 is a block diagram of a computing device 200 that includes the persona application 103, a memory 237, a processor 235, a communication unit 241 and storage 143. In one embodiment, the computing 200 device is a social network server 101. In another embodiment, the computing device 200 is a third-party server 107. In yet another embodiment, the computing device 200 is a user device 115a.

The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

In one embodiment, the computing device also comprises storage 143 that includes user information 240 and a social graph 179 and is coupled to the bus 220 via signal line 244. The user information 240 includes account information for users and persona information for each account. In one embodiment, the user information 240 also includes reputation information. The social graph 179 stores explicitly-defined relationships and relationships implied by social connections between users in the social network. In some examples, the social graph 179 can reflect a mapping of all users in the social network and how they are related.

The communication unit 241 receives data from the user devices 115, the third-party server 107 and/or the social network server 101 depending upon where the persona application 103 is stored. The communication unit 241 transmits the data to the persona application 103. The communication unit 241 is coupled to the bus 220 via signal line 242. In one embodiment, the communication unit 241 includes a port for direct physical connection to the network 105 or to another communication channel. For example, the communication unit 241 includes a USB, SD, CAT-5 or similar port for wired communication with the network 105. In another embodiment, the communication unit 241 includes a wireless transceiver for exchanging data with the network 105, or with another communication channel, using one or more wireless communication methods, such as IEEE 802.11, IEEE 802.16, BLUETOOTH®, near field communication (NFC) or another suitable wireless communication method. In one embodiment, the communication unit 241 includes a NFC chip that generates a radio frequency (RF) for short-range communication.

In one embodiment, the persona application 103 comprises a communication engine 201, an account engine 207, a persona engine 213, an authority engine 219 and a user interface engine 230.

The communication engine 201 is software including routines for receiving and routing requests to the other persona application 103 modules and for relaying outputs via the communication unit 241 to a third-party server, a social network server 101 or a user device 115a. In one embodiment, the communication engine 201 is a set of instructions executable by the processor 235 to provide the functionality described below for receiving and routing requests. In another embodiment, the communication engine 201 is stored in the memory 237 of the computing device 200 and is accessible and executable by the processor 235. In either embodiment, the communication engine 201 is adapted for cooperation and communication with the processor 235 and other components of the computing device 200 via signal line 221.

The communication engine 201 receives requests from the user through the user interface engine 230 or via the communication unit 241. In one embodiment, the received request is for registering an account and corresponding account registration information is received with the request. In another embodiment, the request is for creating personas for an account and the communication engine 201 receives information for the personas from the user's input. For example, the information includes a name of the persona, an icon, a description, permission to perform certain actions and a sharing property. In another example, the information also includes a visibility level. In yet another embodiment, the communication engine 201 receives requests for displaying all personas of a user and for displaying a user as one of the personas.

The communication engine 201 routes the received requests to the account engine 207 and the persona engine 213 accordingly. For example, if the received request is for registering an account or creating one or more personas, it is routed to the account engine 207. The corresponding registration information is transmitted with the request to the account engine 207 as well. If a request for displaying all personas of a user or for displaying a user as one of the personas is received, the communication engine 201 transmits it to the persona engine 213.

In one embodiment, the communication engine 201 also generates and sends inquiries to other users via the communication unit 241 based on the information transmitted from the persona engine 213 and receives answers from the friends. For example, when the communication engine 201 receives a list of friends from the persona engine 213 with whom the user wants to share a persona, the communication engine 201 generates and transmits a set of inquiries to invite people on the list to share the persona. In one embodiment, the inquiries include information for the shared personas. The communication engine 201 then receives answers from the friends via the communication unit 241. In one embodiment, the communication engine 201 transmits the answers and the information for the shared personas back to the persona engine 213. In another embodiment, the communication engine 201 only transmits the answers to the persona engine 213.

In one embodiment, the communication engine 201 routes information from the account engine 207 and the persona engine 213 to the user interface engine 230. For example, the communication engine 201 receives account information and a set of personas for the account from the account engine 207 and transmits the account information and personas to the user interface engine 230 to generate a display for the user that is rendered on the user device 115. In another example, the communication engine 201 receives information for all personas or information for a selected persona from the persona engine 213 and sends the information to the user interface engine 230.

In one embodiment, the communication engine 201 also receives a result of sharing personas with friends from the persona engine 213. For example, the result includes information for the shared personas, such as the name, the icon and the description of each shared persona. The communication engine 201 transmits the result to the user interface engine 230 to display the result (i.e., the information for the shared personas) to the friends. Furthermore, the result includes a sharing property for each shared persona, e.g., sharing with Jessica Yu and Melissa Alien. The friend who shares the persona will see others who share the persona too. In some examples, the result is a message informing the user that a friend has refused the invitation.

The account engine 207 is software including routines for receiving account registration information. In one embodiment, the account engine 207 is a set of instructions executable by the processor 235 to provide the functionality described below for receiving account information for a user and storing the information. In another embodiment, the account engine 207 is stored in the memory 237 of the computing device 200 and is accessible and executable by the processor 235. In either embodiment, the account engine 207 is adapted for cooperation and communication with the processor 235 and other components of the computing device 200 via signal line 222.

In one embodiment, the account engine 207 receives a request for registering an account from the communication engine 201. The account engine 207 obtains registration information for the account, e.g., a name, a password, an age, optional personal information, an email address and/or other contact information. In one embodiment, the account engine 207 receives information for linking the account with a social network application 109. The account engine 207 generates an account using the registration information and stores the account and corresponding registration information as user information 240 in storage 143. In one embodiment, the account engine 207 generates a file for each account and stores the file as user information 240. In another embodiment, the account engine 207 creates a table and adds an entry of the account in the table for mapping the registration information to the account.

The persona engine 213 is software including routines for generating personas, for associating the personas with a user account and for transmitting a selected persona to the user. In one embodiment, the persona engine 213 is a set of instructions executable by the processor 235 to provide the functionality described below for generating personas. In another embodiment, the persona engine 213 is stored in the memory 237 of the computing device 200 and is accessible and executable by the processor 235. In either embodiment, the persona engine 213 is adapted for cooperation and communication with the processor 235 and other components of the computing device 200 via signal line 223.

The persona engine 213 receives a request for creating a plurality of personas for an account from the communication engine 201. The personas include a user persona, an alter ego and a one-time anonymous persona. The alter ego includes a general persona, such as Sara1985 or persona for a specific interest, such as FoodGirl1 (interested in food) and Dark Avenger (interested in comics). The persona engine 213 associates the information for the personas with the corresponding user account. In one embodiment, the persona engine 213 saves the information for the personas in the account file. In another embodiment, the persona engine 213 generates another file for storing the information for the plurality of personas and associates the personas file with the account file. In yet another embodiment, the persona engine 213 appends an item to the account entry in the table for mapping the information for the plurality of personas to the account.

In one embodiment, the persona engine 213 receives a request from the communication engine 201 to retrieve all personas for an account for a user to choose a persona. The persona engine 213 retrieves the information for all personas including the user's real identity from the user information 240. In one embodiment, the persona engine 213 only retrieves the names and pictures of the personas. In another embodiment, the persona engine 213 also retrieves the visibility levels of all the personas if there are visibility levels received when creating the personas. The visibility levels are managed by the authority engine 219 and discussed in greater detail below. The persona engine 213 transmits the results with instructions to generate a user interface for displaying the results to the user interface engine 230.

In one embodiment, the persona engine 213 also arranges the personas, e.g., in order that the most recently or the most frequently used persona appears first. In another embodiment, the persona engine 213 predicts which personas are most likely to be chosen by the user and arranges the personas according to the likelihood of selection. The prediction is based on the relevancy between the description of the persona and the activity that the user wants the persona to do. For example, for a user that wants to upload a picture revealing the environment pollution of a city, the persona engine 213 identifies the persona EarthSecurer with a description about being an environmentalist as the suggested persona for the user. The prediction is also based on the usage history of the personas. For example, if the persona Dark Avenger is often used to comment on posts related to anime, then the persona Dark Avenger is arranged before other personas when the user visits an anime blog.

In one embodiment, the persona engine 213 receives a selection of a persona from the user through the communication engine 201. For example, when the user clicks the persona Dark Avenger on a website that displays the user interface (UI), the persona engine 213 receives the selection of the persona Dark Avenger from the user interface engine 230 via the communication engine 201. In one embodiment, the persona engine 213 retrieves the visibility level of the selected persona from the user information 240 if it was not previously retrieved with the request for displaying all personas. The persona engine 213 transmits the selected persona, for example, including a name, a picture and its visibility level to the user interface engine 230 to further display the selected persona and a list of visibility levels in the GUI.

In one embodiment, the persona engine 213 includes a sharing option that associates a single persona with multiple users. This is particularly helpful in a corporate setting where, for example, multiple users maintain a persona for posting about the company on social networks. In another example, multiple users that maintain the same blog use a single persona for leaving comments on the blog or other peoples' blogs. In this embodiment, the persona engine 213 retrieves user information 240 for the shared persona and the list of friends with whom the user wants to share the persona. In some examples, the persona engine 213 does this responsive to creating a new persona.

The persona engine 213 generates a persona sharing inquiry for the list of friends and transmits the inquiry to the communication engine 201 for sending to the friends via the communication unit 241. If the answer from a friend is yes, the persona engine 213 associates the information for the shared persona with the friend account, for example, by storing the information of the shared persona in the friend account file or by appending an entry in the table for mapping the information of the shared persona to the friend account. The persona engine 213 also instructs the user interface engine 230 to display information for the shared persona to the friend through the communication engine 201. If the answer is no, the persona engine 213 does nothing but inform the user that the offer was not accepted by the friend via the communication engine 201.

In one embodiment, the information for the shared persona, such as the name, the icon, the description, the permissions, the option to share the persona and the visibility level if there is one, cannot be changed by the friends who are invited to share the persona, but can be modified only by the creator of the persona. In another embodiment, the permissions for the shared persona can be modified by anyone who has permission to use the persona. For example, a friend who is not the creator changes the permission from allowing anyone to see the user name associated with the user's real identity to only allowing the user's friends to see the user name associated with the user's real identity, without changing the permission of the shared persona that the creator and/or other users own. In yet another embodiment, the visibility level is modified anytime an owner uses the shared persona. In yet another embodiment, the friend who shares the persona can further share it with other users.

The authority engine 219 is software including routines for managing the visibility level of the persona by determining an appearance of a persona, managing the permissions by authorizing other account holders to view the user's real identity and assigning a reputation for a persona. In one embodiment, the authority engine 219 is a set of instructions executable by the processor 235 to provide the functionality described below and saving the user information 240 to the memory 237. In another embodiment, the authority engine 219 is stored in the memory 237 of the computing device 200 and is accessible and executable by the processor 235. In either embodiment, the authority engine 219 is adapted for cooperation and communication with the processor 235 and other components of the computing device 200 via signal line 224.

The authority engine 219 determines an appearance of a persona based on the visibility level and saves the visibility level as user information 240 that is retrieved by the persona engine 213. The visibility level is one of public, public to everyone over a threshold age (e.g. visible to all users over 13), selectively visible (e.g., visible to all people within a group, a network or only to selected users) and hidden from everyone (e.g. one-time anonymous). In one embodiment, the visibility level is set to a default visibility level during creation of the persona. The default visibility level includes public and selectively visible. The default visibility level is confirmed or changed when a user requests displaying as one of the personas. When the user interface engine 230 receives a selection of one of the personas, the default visibility level of the selected persona is provided as well as other possible visibility levels.

For example, the authority engine 219 creates a persona named Dark Avenger and associates the information for Dark Avenger with the user, Sara Johnson. The authority engine 219 generates permissions that are associated with the persona, Dark Avenger. For example, Sara's identity as Dark Avenger can be hidden from everyone (a secret identity), granted only to specific individuals, granted to all individuals in a group (such as a Google Plus Circle), granted to all individuals in her network, granted to all users in the universe of the network, granted to users over a threshold age or granted to the public. These settings can be modified for the persona such that a real identity could be revealed. In another example all of Sara Johnson's friends can view Sara's identity even though the Dark Avenger persona is displayed. In another example, only Sara's friends will see the Dark Avenger persona and everyone else sees the user posting as an anonymous user. In addition to permission data, the persona engine 213 associates an image and a description of the personality for Dark Avenger (e.g., interested in anime and duck hunting) with the account. In another embodiment, the visibility level is determined only when a user requests the display of one of the personas. All visibility levels are displayed for the selected persona.

Once a visibility level for the selected persona is chosen and received from the user interface engine 230, the authority engine 219 determines the appearance of the selected persona according to the received visibility level. For example, if the received visibility level is public, then the corresponding persona is determined to be visible to anyone who accesses the activity (e.g., the persona is displayed in association with a comment, a post, a picture, a video, etc.). If the received visibility level is private over a threshold age, the authority engine 219 displays the persona if the viewer is over the threshold age and blocks the comment entirely if the viewed is under the threshold age.

If the received visibility level is selected as visible to all friends, the persona is visible to all the user's friends, but not visible to others. When others access the activity of the user, they see an activity performed by an anonymous or guest user. For example, they see an anonymous post. The friends see, for example, the persona name Dark Avenger, while accessing the activity of the user. In some examples, the received visibility level is one-time. In those cases, the authority engine 219 determines the corresponding persona to be anonymous to everyone. This is ideal for situations where the user does not want the activity to be attributed to him or her. For example, the user wants to express displeasure over a post.

In one embodiment, the authority engine 219 manages the permissions by authorizing other account holders to view the user's real identity while accessing the user's persona, based on the permission received when creating the persona. The permission is chosen from allowing all friends, selected friends, all account holders or anyone to see the user's real identity. Accordingly, the authority engine 219 authorizes the corresponding group of people to access the user's real identity. For example, if Tom Johnson is in the group of people permitted by the user Sara Johnson to see Dark Avenger's identity, he is authorized to see Sara Johnson's name in her comments as Dark Avenger. In one embodiment, the user's real identity of Sara Johnson is revealed to Tom Johnson when Tom Johnson hovers over the persona named Dark Avenger using a mouse or when Tom Johnson clicks on the Dark Avenger and a new window pops up with Dark Avenger's profile, which includes a field for revealing Sara Johnson as the user. In yet another embodiment, Tom Johnson sees the annotation "Sara Johnson posting as Dark Avenger" when he accesses the comment.

In one embodiment, the image for the personas is an image of the user with a mask overlaid onto the user's face. In another embodiment, the image for the persona is a unique image provided by the user, but when displayed a consistent visual is overlaid to disambiguate them from non-persona users. For example, a small "mask" icon could indicate that Dark Avenger is a persona and not a real identity. In another example a variety of standard visual indicators are selected to indicate the type of persona such as corporation, secret identity, character, parody, etc. In the case of a corporate persona, the persona is confirmed and displayed as authoritative while remaining a persona.

In one embodiment, the authority engine 219 builds a reputation for each persona. Each persona for an account has its own reputation because if the reputation was related to all personas, it would risk compromising the user's privacy by revealing that the user was both Dark Avenger and FoodGirl1. The authority engine 219 records activities and feedback for the activities of each persona and assigns a reputation to each persona based on the activities and feedback. For example, Sara Johnson has two personas, e.g., Dark Avenger and Food-Girl1. If FoodGirl1 is used to submit a lot of posts, comments, pictures and videos that receive many views, comments and approval indications, then FoodGirl1 is assigned a correspondingly high reputation. Conversely, if Dark Avenger is used to leave nasty comments and mock bloggers, the authority engine 219 assigned Dark Avenger a low reputation. Neither Dark Avenger nor Sara Johnson is associated with the reputation assigned to FoodGirl1. By treating each persona separately, the user is able to act as independent personas with different personalities. Likewise, if a persona's content was generated by several individuals its reputation reflects the aggregate contributions of the persona.

The user interface engine 230 is software including routines for generating a user interface that allows the input of the information for registering an account and a plurality of personas, receiving a selection of persona and generating a display for the selected persona. In one embodiment, the user interface engine 230 is a set of instructions executable by the processor 235 to provide the functionality described below for displaying the selected persona. In another embodiment, the user interface engine 230 is stored in the memory 237 of the computing device 200 and is accessible and executable by the processor 235. In either embodiment, the user interface engine 230 is adapted for cooperation and communication with the processor 235 and other components of the computing device 200 via signal line 261.

User Interface Engine 230

Figure 3:
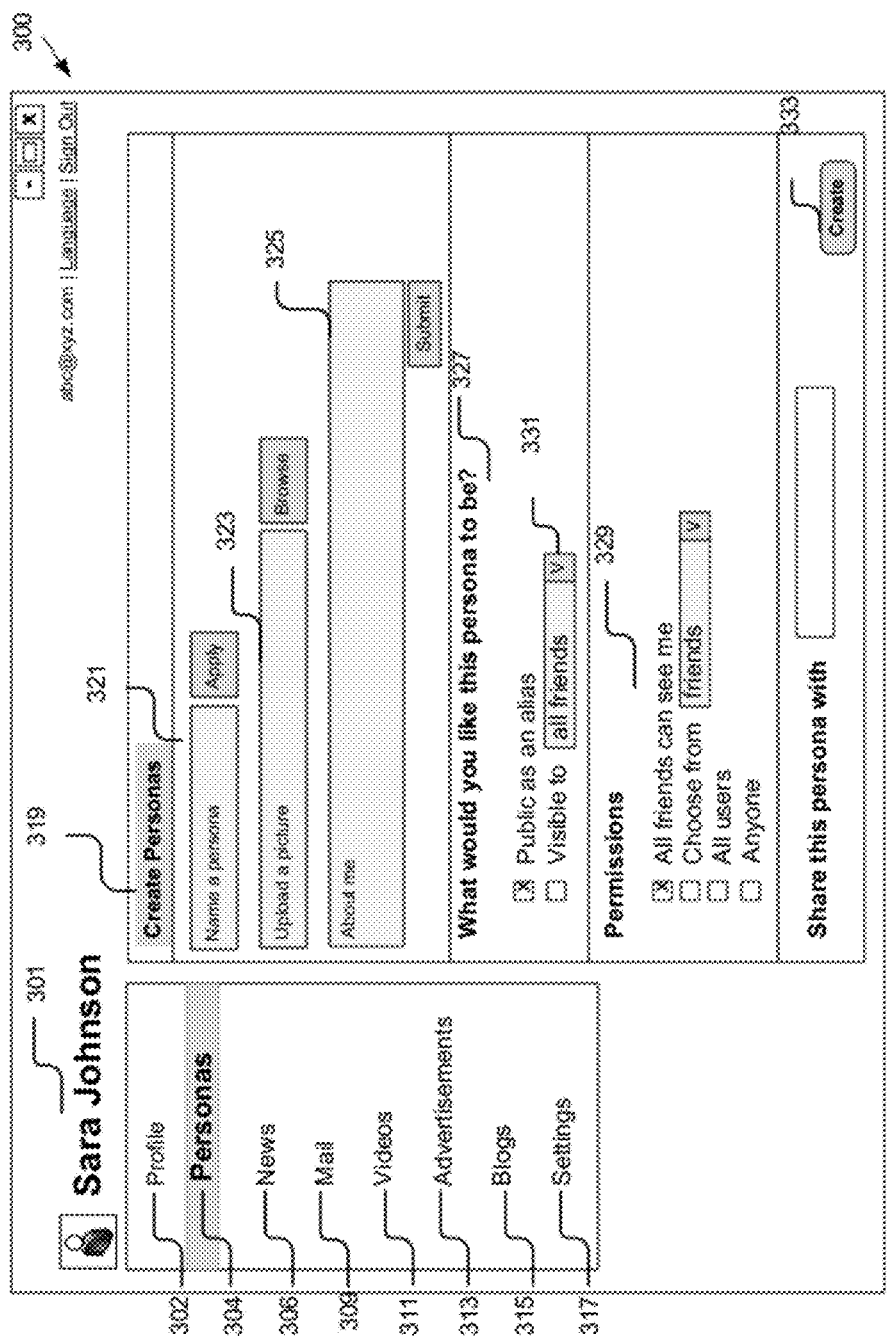
FIG. 3 is a graphic representation of a user interface that is generated by the user interface engine for creating personas for an account of a user.

Turning now to the user interface engine 230, FIG. 3 is a graphic representation 300 of a user interface that is generated by the user interface engine 230 for creating personas for a user. In this example, the user can switch between the profile 302, personas 304, news 306, mail 309, videos 311, advertisements 313, blogs 315 and settings 317. By clicking personas 304, the user Sara Johnson 301 views the create a persona tab 319 by inputting a name of the persona 321, uploading a picture 323, submitting a description 325, choosing a visibility level 327, selecting a permission 329 and providing a group of people whom she wants to share acting as the persona with, e.g., selected friends. In order to select a permission, the user selects from allowing all friends, allowing chosen friends, allowing all users and allowing anyone to determine who can see the user's real identity. The visibility level 327 is chosen among the public options as an alias and selectively visible. To further choose the friends whom the persona is visible to, the user clicks drawdown selection list 331 to choose all friends or selected friends who can see the persona name. By clicking the create button 333, the persona is created for Sara Johnson.

Figure 4:
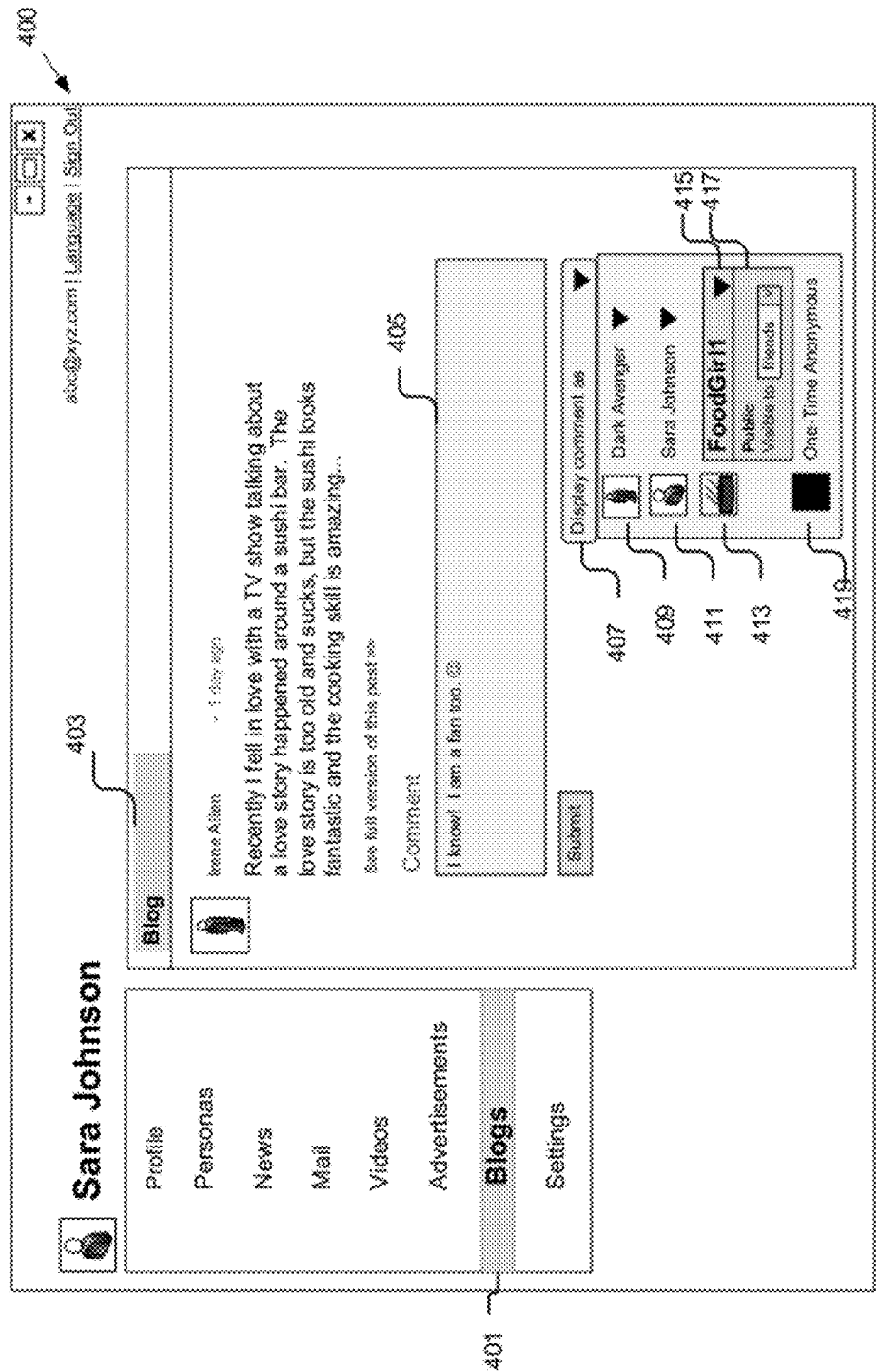
FIG. 4 is a graphic representation of a user interface that is generated by the user interface engine for displaying as one of the personas.

FIG. 4 is a graphic representation 400 of a user interface that is generated by the user interface engine 230 for displaying the user as one of the personas. When the user clicks the dropdown arrow 407 for displaying the personas, the user interface engine 230 displays a list of personas (Dark Avenger 409, Sara Johnson 411, FoodGirl1 413 and One-Time Anonymous 419) for selecting which persona is associated with a comment for the user Sara Johnson. In this example, the user selects FoodGirl1 by clicking the choice box "FoodGirl1" 415 and the user interface engine 230 displays a list of visibility levels 417 when the user clicks the dropdown arrow in the box. The public visibility level is bolded because when creating the persona FoodGirl1, the user selected public as the default visibility level. The user confirms the default visibility level by not selecting the dropdown box and changes the visibility level by clicking the "visible to" option. The user interface displays an option for further limiting visibility of the persona to different groups, such as all friends or specific friends. The one-time anonymous option allows the user to post anonymously. The post is not associated with a unique account and, as a result, the series of comments posted by the user as an anonymous user are not tracked. In another embodiment, anonymous posts are tracked and associated with the posting user but not displayed as such. In this embodiment responses to the anonymous post can be displayed in in the posting user's stream (e.g. in a stream—"JoJo1977 responded to your anonymous post"). Additionally, an anonymous post could be modified by the poster to reveal the real identity of the poster of that comment at a later time.

In this example, the user's activity is submitting a comment 405 for a blog post 403 that is displayed when the user switches to blogs 401. In other examples, the system displays the user as one of the personas when the user does other activities, such as submitting a post, uploading a picture or a video, sending a message, etc. These activities are displayed with one of the personas or as anonymous according to the selected visibility level.

Methods

Figure 5:
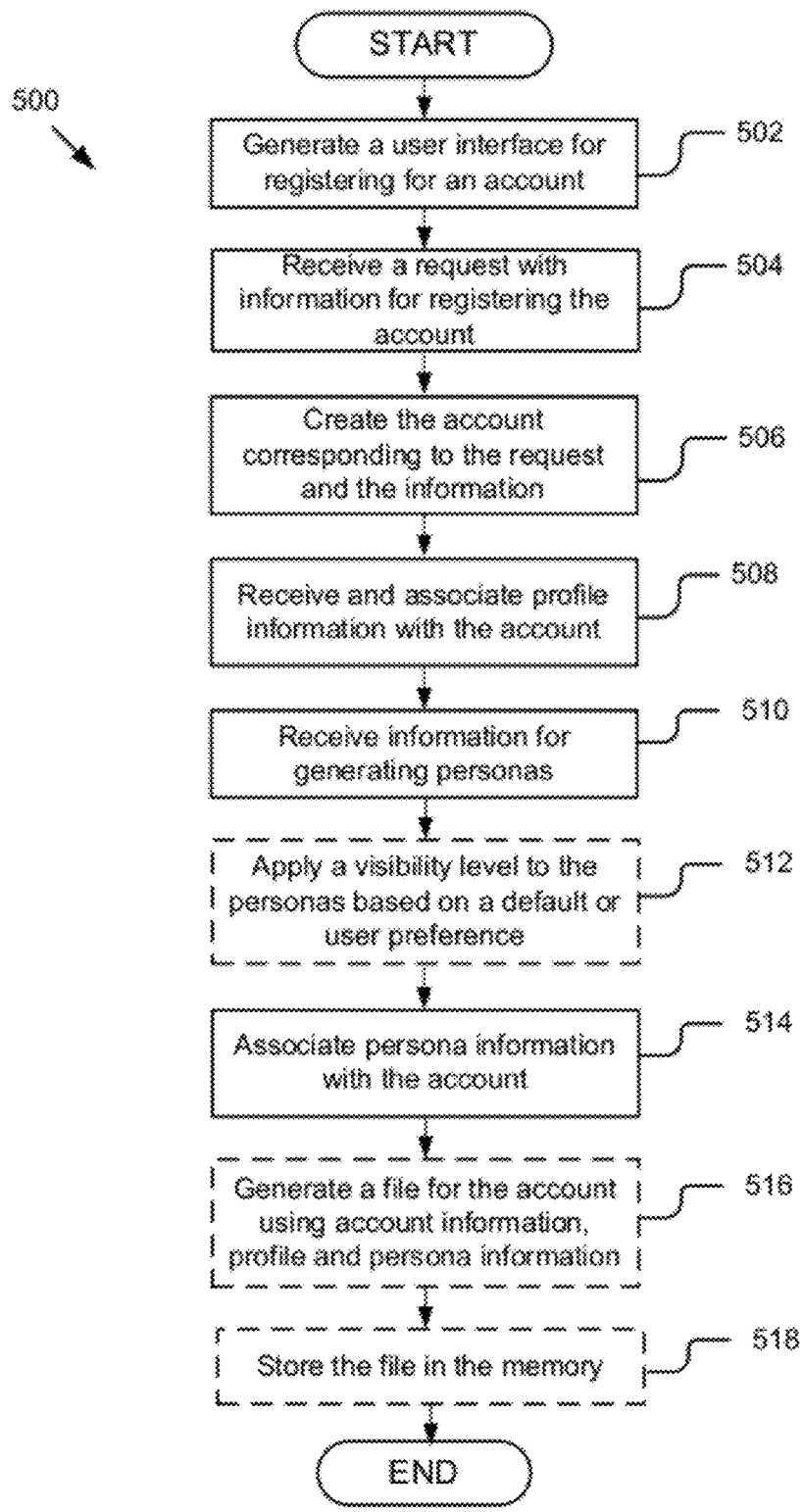
FIG. 5 is a flow diagram of one embodiment of a method for generating a plurality of personas.
Figure 6:
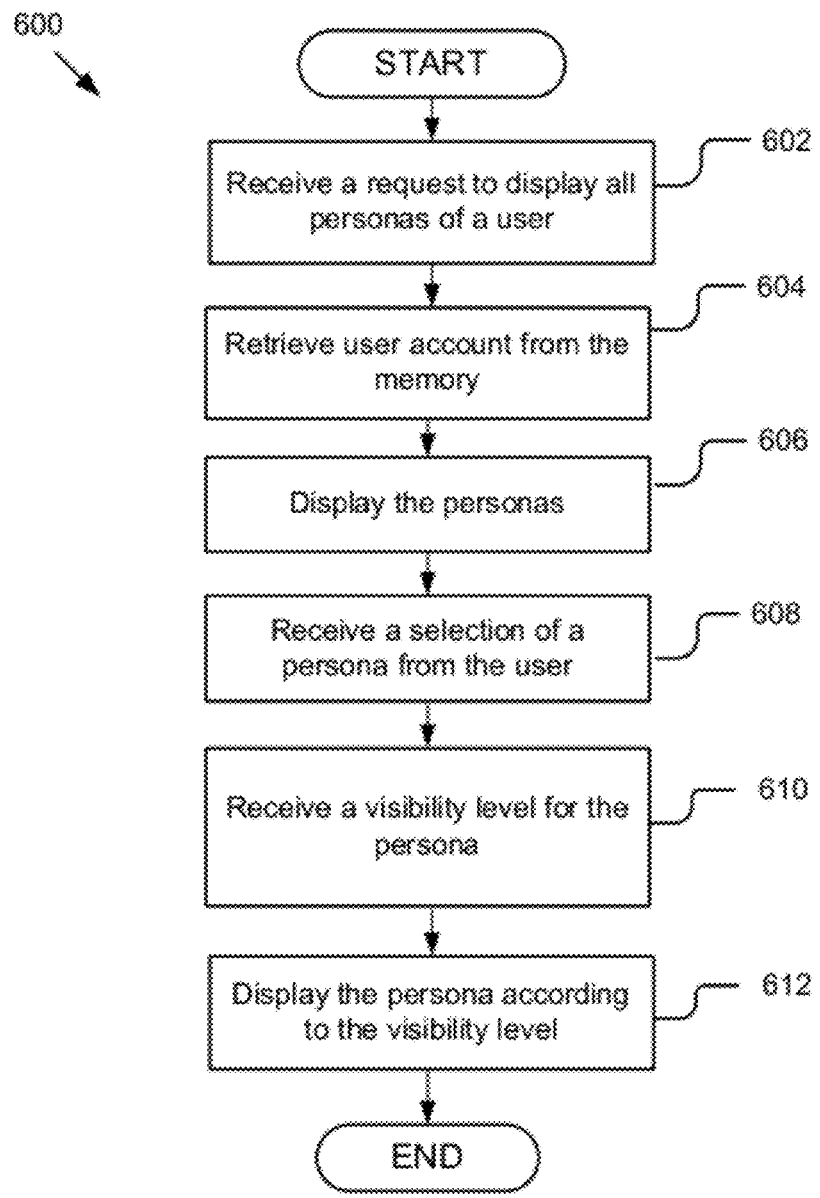
FIG. 6 is a flow diagram of one embodiment of a method for displaying as one persona according to a selection.
Figure 7:
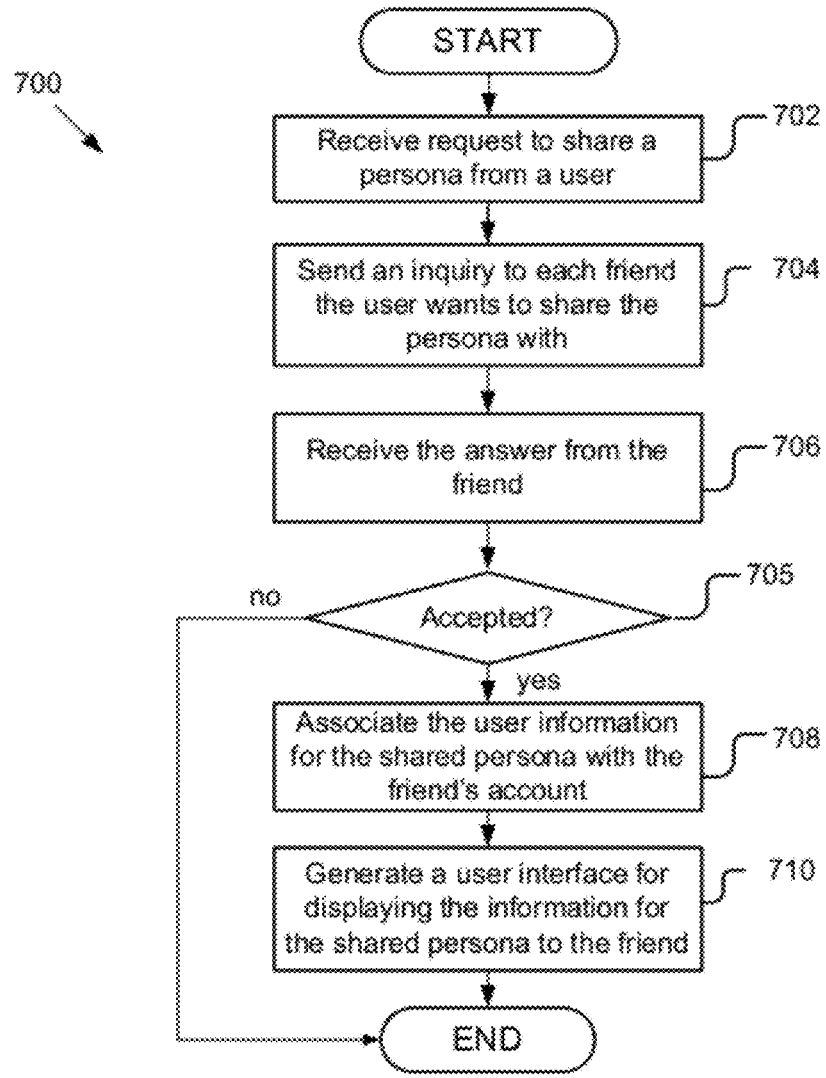
FIG. 7 is a flow diagram of one embodiment of a method for sharing a persona between users.

Referring now to FIGS. 5-7, various embodiments of the method of the specification will be described. FIG. 5 is a flow diagram 500 of one embodiment of a method for generating personas for a user account. The user interface engine 230 generates 502 a user interface for registering for an account and receives 504 a request with information for registering the account. For example, the user provides a name, an email address and a password. The request and information for the account are relayed to the account engine 207 via the communication engine 201. Once the account engine 207 receives the request and the information, the account engine 207 creates 506 the account corresponding to the request and the information. In one embodiment, the account engine 207 generates a file to store the account information. In another embodiment, the account engine 207 saves the account information into a database as user information 240 and creates a table including an entry for mapping the account information to the account. If a table for mapping account information to accounts already exists, the account engine 207 appends an entry in the table for mapping the received account information to the new account.

The account engine 207 also receives and associates 508 profile information with the account. The profile information includes pictures, education and work experiences, interests and other personal information for the user. Similarly, in one embodiment, the account engine 207 maps the profile information to the account by adding an entry in the table or by creating a new table. In another embodiment, the account engine 207 saves the profile information as user information 240.

The persona engine 207 receives 510 information for generating personas from the user interface via the communication engine 201. The information for each persona includes a name, a picture, a description, a permission and a sharing property. Optionally, the information includes a visibility level. In such a case, the account engine 207 applies 512 visibility levels to the personas based on a default or a user preference. The account engine 207 associates 514 the persona information with the account either by saving the persona information in the account file or by adding an entry in the table for mapping the persona information to the account.

Optionally, the account engine 207 generates 516 a file for the account using account information, profile and persona information after receiving them all. The account engine 207 stores 518 the file in the memory 237, for example, as user information 240.

FIG. 6 is a flow diagram 600 of one embodiment of a method for generating a user interface for displaying a persona. The persona engine 213 receives 602 a request to display all personas of a user via communication engine 201. The persona engine 213 retrieves 604 the user account from the memory 237. In one embodiment, the persona engine 213 retrieves the account file including the account information, profile and personas information from the user info 240. In another embodiment, the persona engine 213 retrieves the account and all the information from a database in the user info 240 by querying a table for mapping the information to the account.

In one embodiment, the persona engine 213 transmits the account and all the information to the user interface engine 230 through the communication engine 201. The user interface engine 230 displays 606 the personas for the user to choose one from them. The user interface engine 230 receives 608 a selection of a persona from the user and also receives 610 a visibility level for the selected persona. In one embodiment, the user interface engine 230 transmits the visibility level for the selected persona to the authority engine 219 and the authority engine 219 determines the appearance of the selected persona based on the visibility level. For example, if the visibility level is selected to be public, then the selected persona is determined to appear with the activity of the user, such as a comment, no matter who views the comment, i.e. the selected persona is visible to anyone. The authority engine 219 transmits the determination back to the user interface engine 230 and the user interface engine 230 displays the persona according to the visibility level (i.e., the determination of the appearance of the selected persona).

FIG. 7 is a flow diagram 700 of one embodiment of a method for sharing a persona between users. The persona engine 213 receives 702 a request to share a shared persona from a user. In one embodiment, the persona engine 213 receives the request from the user interface engine 230 via the communication engine 201. The communication engine 201 sends 704 an inquiry to each friend the user wants to share the persona with and receives 706 the answer from the friend.

If the friend who receives the inquiry accepts 705 the offer of sharing the persona and thus the answer is yes, the persona engine 213 associates 708 the user information 240 for the shared persona with the friend's account. In one embodiment, the persona engine 213 stores the information for the shared persona with the friend's account file. In another embodiment, the persona engine 213 adds an entry in the table for mapping the information of the shared persona to the friend's account. Either way, the shared persona is associated with the friend. The user interface engine 230 generates 710 a user interface for displaying the information for the shared persona to the friend. If the answer is no, the process ends and, in one embodiment, the persona engine 213 generates a notification that is incorporated into the user interface generated by the user interface engine 230 that the offer was not accepted.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for generating a plurality of personas for an account of a user of a social network performed on one or more computing devices, the method comprising:

receiving, using the one or more computing devices, information for the plurality of personas from the user;

associating the information for the plurality of personas to the account of the user;

predicting which of the plurality of personas is more likely to be chosen by the user and arranging the plurality of personas based on a likelihood of selection by the user;

receiving a selection of one of the plurality of personas from the user;

determining, using the one or more computing devices, an appearance of the selected persona; and providing the selected persona for display to the user.

2. The method of claim 1, wherein the plurality of personas include a visibility level of at least one of public, public over a threshold age, visible to selected users and hidden from everyone.

3. The method of claim 2, wherein the visible to selected users visibility level further comprises at least one of being visible to all friends and being visible to selected friends.

4. The method of claim 1, wherein the information for the plurality of personas comprises at least one of a name, a picture, a description, a visibility level, a permission and a sharing property.

5. The method of claim 4, further comprising determining an appearance of the selected persona based at least in part on the visibility level.

6. The method of claim 4, wherein the permission comprises allowing at least one of all friends, selected friends, all account holders and anyone to access the user's real identity.

7. The method of claim 1, further comprising associating one of the plurality of personas with at least one other account holder based at least in part on a sharing property, the sharing property comprising at least one of associating one of the plurality of personas with other account holders and associating one of the plurality of personas with selected friends.

8. The method of claim 1, further comprising generating a reputation for each persona based at least in part on activity or feedback associated with the persona.

9. The method of claim 1, wherein the plurality of personas comprises at least one of the user's real identity, an alter ego and a one-time anonymous identity.

10. The method of claim 1, further comprising transmitting the information for the selected persona in response to the user submitting at least one of a post, a comment, a picture, a video, a message, an article and a game.

11. The method of claim 1, further comprising assigning a reputation to the selected persona according to at least one of a number of views, a number of comments and a number of indications of approval of at least one of the post, the comment, the picture, the video, the message, the article and the game submitted by the selected persona.

12. A system for generating a plurality of personas for an account of a user of a social network, the system comprising:

one or more processors;

an account engine stored on a memory and executable by the one or more processors, the account engine for receiving information for the plurality of personas from the user and associating the information for the plurality of personas to the account of the user;

a persona engine stored on the memory and executable by the one or more processors-coupled to the account engine, the persona engine for predicting which of the plurality of personas is more likely to be chosen by the user, arranging the plurality of personas based on a likelihood of selection by the user, receiving a selection from the user of one of the plurality of personas and providing the selected persona for display to the user; and an authority engine stored on the memory and executable by the one or more processors, the authority engine for determining an appearance of the selected persona.

13. The system of claim 12, wherein the plurality of personas include a visibility level of at least one of public, public over a threshold age, visible to selected users and hidden from everyone.

14. The system of claim 13, wherein the visible to selected users visibility level further comprises at least one of being visible to all friends and being visible to selected friends.

15. The system of claim 12, wherein the information for the plurality of personas comprises at least one of a name, a picture, a description, a visibility level, a permission and a sharing property.

16. The system of claim 12, wherein the persona engine associates one of the plurality of personas with at least one other account holder based at least in part on the sharing property, the sharing property comprising at least one of associating one of the plurality of personas with other account holders and associating one of the plurality of personas with selected friends.

17. The system of claim 12, wherein the authority engine determines an appearance of the selected persona based at least in part on a visibility level associated with the selected persona.

18. The system of claim 12, wherein the authority engine authorizes other account holders to access the user's real identity based at least in part on a permission, the permission comprising allowing at least one of all friends, selected friends, all account holders and anyone to access the user's real identity.

19. The system of claim 12, wherein the plurality of personas comprises at least one of the user's real identity, an alter ego and a one-time anonymous identity.

20. The system of claim 12, wherein the persona engine transmits the information for the selected persona in response to the user submitting at least one of a post, a comment, a picture, a video, a message, an article and a game.

21. The system of claim 12, wherein the authority engine assigns a reputation to the selected persona according to at least one of a number of views, a number of comments and a number of indications of approval of at least one of the post, the comment, the picture, the video, the message, the article and the game submitted by the selected persona.

22. A computer program product comprising a non-transitory computer useable medium including a computer readable program, wherein the computer readable program when executed on a computer causes the computer to perform steps comprising:

receiving information for a plurality of personas from a user;

associating the information for the plurality of personas to an account of the user;

predicting which of the plurality of personas is more likely to be chosen by the user and arranging the plurality of personas based on a likelihood of selection by the user;

receiving a selection of one of the plurality of personas from the user;

determining an appearance of the selected persona; and providing the selected persona to the user.

23. The computer program product of claim 22, wherein the plurality of personas include a visibility level of at least one of public, public over a threshold age, visible to selected users and hidden from everyone.

24. The computer program product of claim 23, wherein the visible to selected users visibility level further comprises at least one of being visible to all friends and being visible to selected friends.

25. The computer program product of claim 22, wherein the information for the plurality of personas comprises at least one of a name, a picture, a description, a visibility level, a permission and a sharing property.

26. The computer program product of claim 25, wherein the computer readable program when executed on the computer causes the computer to further determine an appearance of the selected persona based at least in part on the visibility level.

27. The computer program product of claim 25, wherein the permission comprises allowing at least one of all friends, selected friends, all account holders and anyone to access the user's real identity.

28. The computer program product of claim 22, wherein the computer readable program when executed on the computer causes the computer to further associate one of the plurality of personas with at least one other account holder based at least in part on a sharing property, the sharing property comprising at least one of associating one of the plurality of personas with other account holders and associating one of the plurality of personas with selected friends.

29. The computer program product of claim 22, wherein the computer readable program when executed on the computer causes the computer to further generate a reputation for each persona based at least in part on activity or feedback associated with the persona.

30. The computer program product of claim 22, wherein the plurality of personas comprises at least one of the user's real identity, an alter ego and a one-time anonymous identity.

31. The computer program product of claim 22, wherein the computer readable program when executed on the computer causes the computer to further transmit the information for the selected persona in response to the user submitting at least one of a post, a comment, a picture, a video, a message, an article and a game.

32. The computer program product of claim 22, wherein the computer readable program when executed on the computer causes the computer to further assign a reputation to the selected persona according to at least one of a number of views, a number of comments and a number of indications of approval of at least one of the post, the comment, the picture, the video, the message, the article and the game submitted by the selected persona.

* * * * *